April 7, 1959     O. H. WINN     2,881,390

PIEZO-ELECTRIC TYPE FREQUENCY CHANGER

Filed April 21, 1952

Inventor:
Oliver H. Winn,
by Merton D. Morse
His Attorney.

United States Patent Office 2,881,390
Patented Apr. 7, 1959

2,881,390

PIEZO-ELECTRIC TYPE FREQUENCY CHANGER

Oliver H. Winn, Camillus, N.Y., assignor to General Electric Company, a corporation of New York Application April 21, 1952, Serial No. 283,462

5 Claims. (Cl. 324—68)

My invention relates to pulse generators, and more particularly, pertains to an improved frequency changer of the piezo-electric type for deriving a predetermined number of pulses in response to each of recurrent, reference pulses. Although the invention may have utility in a variety of applications, it is ideally suited as a range marker generator in an indicating system of pulse-echo equipment and for convenience will be described in that connection.

It is an object of my invention to provide an improved piezo-electric type frequency changer which is simple and inexpensive to construct.

Another object of my invention is to provide an improved piezo-electric type frequency changer which affords output pulses of greater amplitude than heretofore possible in this particular class of frequency changers.

A piezo-electric type frequency changer in accordance with my invention comprises a piezo-electric element having a given operating frequency. Input and output electrodes are associated with the piezo-electric element and a shield electrode is interposed between the input and output electrodes. The latter electrode is maintained at a plane of fixed reference potential so as to shield the input and output electrodes from one another. A source of recurrent, reference pulses of a repetition frequency lower than the aforesaid given frequency is coupled to the input electrode and the piezo-electric element is shock excited in response to each reference pulse. Thus, a plurality of oscillations are derived at the output electrode for every reference pulse.

Figure 1:
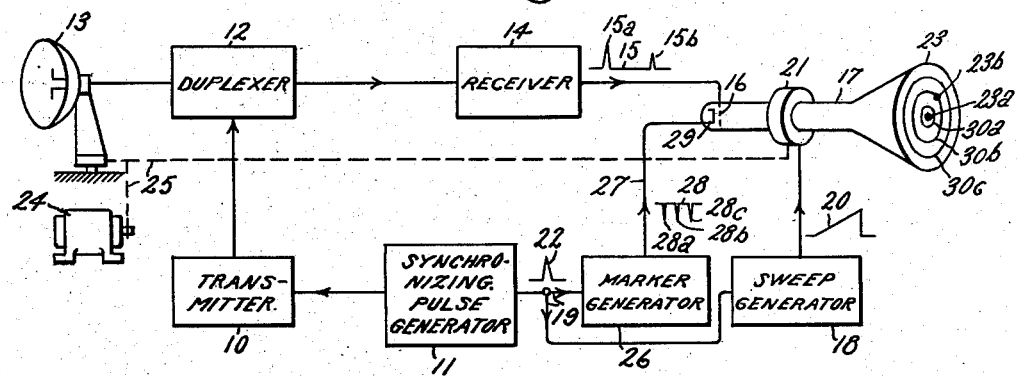
Figure 2:
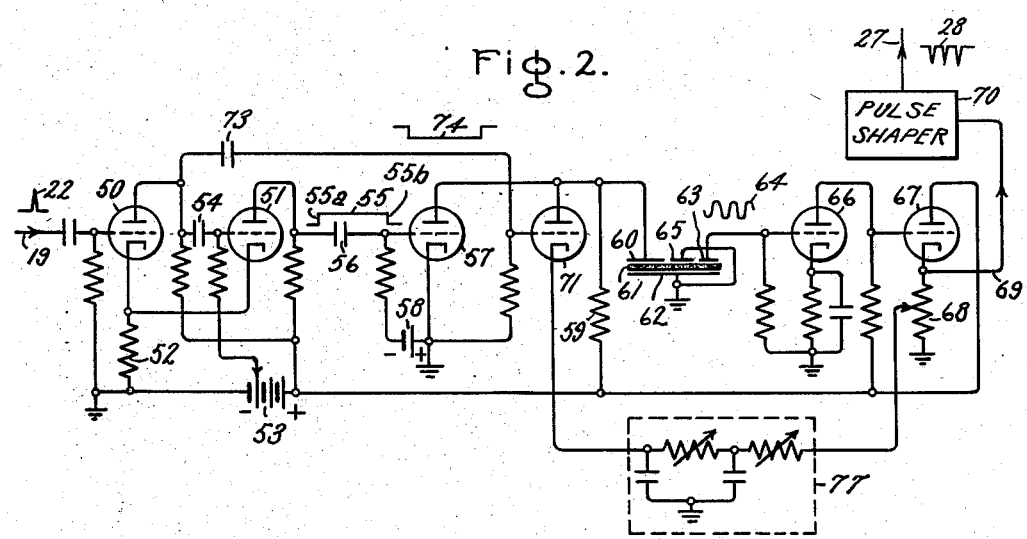

The novel features which I believe to be characteristic of my invention are set forth with particularity in the appended claims. The invention itself, however, both as to its organization and method of operation, together with further objects and advantages thereof, may best be understood by reference to the following description taken in connection with the accompanying drawing in which:

Fig. 1 is a block diagram of a complete radar apparatus including a marker generator incorporating a piezo-electric type frequency changer in accordance with my present invention; and Fig. 2 is a detailed schematic diagram of the marker generator illustrated in Fig. 1.

Referring now to Fig. 1 of the drawing, the radar apparatus there shown includes a transmitter 10 which, under the control of pulses from a synchronizing generator 11, supplies pulses or "bursts" of radio-frequency energy through a duplexer unit 12 to a directional antenna 13 for radiation in space. Such energy travels through space and may impinge upon a reflecting surface of a remote object and, after reflection, returning pulses are intercepted by antenna 13.

Received pulses are supplied through duplexer 12 to a receiver 14 wherein demodulation occurs and a pulse type output wave 15 is supplied to control electrode 16 of a cathode ray indicator 17. Duplexer unit 12 may be of any known construction for preventing blocking and/or damage to receiver 14 during pulse transmissions. Moreover, it serves to translate received energy from antenna 13 to receiver 14 with substantially no attenuation.

As is generally well known, the velocity of propagation of radio-frequency energy is substantially constant, and hence, the range of a reflecting object may be determined by measuring the total travel time of the returning echo pulses. This measurement is performed through the use of an accurate time base sweep for indicator 17 provided by a sweep generator 18 which is coupled to generator 11 via a lead 19 and which may include any well known form of synchronizable means for deriving a highly linear sawtooth wave, such as shown at 20. The sawtooth wave 20 is applied to the coils of a deflection yoke 21 that is supported for rotation about the neck of cathode ray tube 17. Thus, with the occurrence of each of synchronizing pulses 22, the electron beam projected toward viewing screen 23 of tube 17 is deflected radially from the screen center in a direction dependent upon the orientation of yoke 21 and at a rate proportional to twice the velocity of propagation of the energy radiated by antenna 13.

In order to derive target bearing as well as range information, antenna 13 is supported for rotation about a vertical axis. A driving motor 24, mechanically connected to the antenna by suitable gearing illustrated by a dash line 25, imparts continuous rotation thereto. The antenna is mechanically coupled to deflection yoke 21 through suitable gearing, which is illustrated by an extension of dash line 25. Of course, any well known form of mechano-electric device may be interposed between antenna 13 and the deflection yoke in installations wherein the antenna and yoke are located too far apart to permit the use of a direct mechanical connection. In any event, yoke 21 is rotatably synchronized with antenna 13 and rotates once for each revolution of the antenna.

The output wave 15 of receiver 14 is applied to control electrode 16 with such polarity that each of pulsations 15a and 15b of the output wave increase the intensity of the electron beam projected toward viewing screen 23 of cathode ray tube 17. At the same time, sweep wave 22 deflects the electron beam from the center of viewing screen 23 in a radial direction corresponding to antenna orientation.

An indication 23a at the center of screen 23 represents pulse 15a of wave 15 which is due to a small amount of energy from transmitter 10 that passes through duplexer 12 to receiver 14 during pulse transmissions and an indication 23b, represents echo pulse 15b from a remote object. The distance from the screen center (spot 23a) to spot 23b is proportional to the range of the corresponding remote object and the bearing or azimuthal position of the object is defined by the angle subtended by a line intercepting the screen center and passing through spot 23b and a vertical reference line through the screen center.

In order to facilitate the determination of range, the radar apparatus including a marker generator 26 having its input circuit connected to synchronizing generator 11 by an extension of lead 19. Thus, pulses 22 are supplied to generator 26 for synchronizing its operation and there is derived at output lead 27 a wave 28 comprised of a recurrent series of negative pulses 28a–28c. Each of the series of pulses 28a–28c follows the occurrence of one synchronizing pulse 22 and the pulses in a series are spaced from one another and from a corresponding synchronizing pulse by predetermined time intervals which represent selected ranges.

These negative pulses are applied to cathode 29 of indicator tube 17 and intensify the electron beam at predetermined points along its radial sweep over viewing screen 23. Since yoke 21 rotates continuously, the electron beam within cathode ray tube 17 traces out a series of concentric circles 30a–30c which correspond to pulses 28a–28c, respectively.

The marker circles 30a–30c provide a scale on the face of cathode ray tube 17 which may be calibrated directly in terms of range. By comparing the position of indication of 23b with the adjacent range circles, the range of the remote object causing the indication may be easily determined.

Referring now to Fig. 2 of the drawing, there is illustrated a detailed schematic diagram of a piezo-electric type frequency changer constructed in accordance with my invention and which may be employed as marker generator 26 of Fig. 1.

Pulses 22 at lead 19 are applied to the control electrode of an electron discharge device 50 which, together with an electron discharge device 51, is incorporated in a multivibrator circuit. The cathodes of devices 50 and 51 are grounded through a common cathode resistor 52 and their anodes are connected through individual anode resistors to the positive terminal of a source of B supply potential 53, the negative terminal of which is grounded. The control electrode or grid of device 50 is grounded through a grid resistor whereas the control grid of device 51 is connected through a resistor to a positive tap of source 53. Thus, in the absence of applied pulses, anode current flows in device 51 and the resulting potential drop across cathode resistor 52 biases device 50 to anode current cut-off.

The pulses 22 are applied with positive polarity to the control electrode of device 50 and each pulse initiates the flow of anode current therein. The resulting decreases in potential at the anode of this device is applied to the grid of device 51 over a coupling condenser 54 and anode current in the latter device decreases. This lowers the potential drop, due to anode current of device 51, across resistor 52 and current flow in device 50 increases further. The action is regenerative and, almost concurrently with the leading edge of pulse 22, the conditions of conduction are reversed. Thus, device 50 draws anode current and none flows in device 51.

This condition persists until the charge on condenser 54 is able to leak off through the grid resistor of device 51 sufficiently to reduce the negative voltage to the point where this tube draws anode current. Thereupon, because of the regenerative action, almost instantaneously the anode current conditions of devices 50 and 51 are again reversed and the originally-assumed states are established.

As a result of the abrupt changes in anode current, there is derived at the anode of device 51 a series of positive, rectangular pulses 55. The leading edge 55a of each of these pulses occurs essentially concurrently with the leading edge of the corresponding one of synchronizing pulses 22 and the trailing edge 55b is time-spaced from the leading edge 55a by an interval that is adjusted to provide for the production of the required number of marker rings displayed on cathode ray tube screen 23 of Fig. 1.

Rectangular pulses 55 are applied over a condenser 56 to the control electrode of an electron discharge device 57. A bias source 58 maintains the control electrode-cathode potential of device 57 sufficiently negative to prevent the flow of anode current in the absence of pulses 55. However, each of these pulses has a great enough amplitude to overcome the bias and amplification occurs in device 57.

The anode of electron discharge device 57 is connected to the positive terminal source 53 through an anode load resistor 59 and also is connected to an input electrode or plate 60 associated with a piezo-electric element or crystal 61 which, for example, may be constructed of quartz. Electrode 60 is disposed adjacent one surface of the crystal, covering a portion of the area thereof, and another electrode 62 is disposed adjacent the opposite surface of the crystal. The latter electrode has an area corresponding to that of the crystal surface and it is connected to ground.

Electrodes 60 and 62 constitute a shunt capacitance which, during operating intervals wherein device 57 is cut off, charges to the potential of source 53. With the occurrence of leading edge 55a of pulse 55, device 57 is abruptly rendered conductive and capacitor 60—62 is suddenly shunted by the anode-cathode impedance device 57. This impedance is low compared with that of capacitor 60—62 and the capacitor discharges rapidly. Thus, piezo-electric element 61 is shocked-excited and vibrates vigorously at a given operating frequency which is dependent upon its physical dimensions, as is generally well understood.

An output electrode 63, associated with crystal 61, is positioned adjacent the same surface of the crystal as is input electrode 60, but is physically spaced therefrom. As a result of the vibration of element 61, a plurality of sine wave oscillations at the given operating frequency, such as shown by wave 64, are derived between output electrode 63 and electrode 62. This occurs in response to each of the driving pulses which shock-excites the crystal element.

A shield electrode 65 is disposed adjacent the first-mentioned surface of crystal element 61 and is interposed between input electrode 61 and output electrode 63. It is connected to ground and serves to shield electrically the input and output electrodes from one another. With this arrangement, a very high degree of isolation is achieved between the input and output electrodes and, therefore, the crystal may be more heavily excited than in an arrangement not employing such shielding. The greater excitation permits much greater output amplitudes for wave 64 than heretofore obtainable.

Output wave 64 is applied to the control electrode-cathode circuit of an electron discharge device 66 which is powered by source 53 and which operates as a conventional amplifier. Its anode is directly connected to the control electrode of another electron discharge device 67. The anode of device 67 is directly connected to the positive terminal source 53 and its cathode is grounded through a load resistor 68. Device 67 thus operates as a cathode-follower and the applied wave is reproduced with no change in polarity at its cathode. The reproduced wave is supplied over a lead 69 to a pulse shaper 70. Shaper 70 produces one of the negative pulses of wave 28 for each complete cycle in sine wave 64 and may be of conventional construction.

In order to terminate oscillations 64 after the production of a predetermined number of complete cycles, the frequency divider is provided with a damping circuit including an electron discharge device 71. Its cathode is connected through the series resistors of a phase shifting network 77 to a movable tap of cathode resistor 68. Phase shifting network 77 also includes shunt condensers which are connected to ground. The anode of device 71 is directly connected to electrode 60 of piezo-electric element 61.

During the operation of multivibrator 50—51, in addition to the production of the positive pulses 55, negative, rectangular pulses 74 of corresponding timing are developed at the anode device 50. These negative pulses are applied over a coupling condenser 73 to the control electrode of device 71 and each has sufficient amplitude to render this device non-conductive. However, with the termination of negative pulse 74, device 71 becomes conductive and operates as a cathode-driven amplifier. The wave derived in the cathode circuit of device 67 and supplied via phase shifting network 77 to the cathode of device 71 is thus amplified and applied to electrodes 60—62.

The phase delay produced by network 77 is adjusted so that the amplified wave applied to electrodes 60—62 opposes the generation of oscillations 64. In other words, piezo-electric element 61 is effectively damped at the termination of each of rectangular pulses 74 through the use of degenerative feedback. This phase delay is in the neighborhood of 90° to accommodate the phase shift inherent in the condenser formed by electrodes 60 and 62, but may deviate from this figure in order to compensate for the phase delay in the piezo-electric element itself. The movable tap of cathode resistor 68 is adjusted to provide an opposing wave of an amplitude sufficiently high for the required damping, but not great enough to appear at output electrode 63.

It may thus be seen that with the occurrence of each synchronizing pulse 22, rectangular pulses 55 and 74 are initiated and crystal 61 is shock excited. After a predetermined number of oscillations, dependent upon the duration of the rectangular pulses, a feed-back is applied in a phase relation to damp the piezo-electric element. Therefore, a predetermined number cycles of wave 64 are generated and a corresponding number of pulses in wave 28 are supplied to cathode ray tube 17.

As pointed out above, because of the isolation between the input and output electrodes the crystal may be more heavily excited than heretofore possible. For example, in one practical embodiment of the invention, driving pulses having an amplitude of 300 volts were applied to the input electrode of the crystal and output pulses of less than .01 volt were observed, while output oscillations of 0.5 to 1 volt were measured. It was estimated that the desired output voltage, in this example, was 50 to 100 times greater than that possible with a conventional circuit.

From an inspection of Fig. 2 it will be observed that the circuit is relatively simple and, therefore, inexpensive to construct. Moreover, it is considerably less complex and less critical in adjustment than conventional piezo-electric type frequency changers which employ a precision bridge circuit for preventing the driving pulses from appearing at the output of the divider.

While I have shown a particular embodiment of my invention, it will of course be understood that I do not wish to be limited thereto since various modifications may be made, and hence, it is contemplated by the appended claims to cover any such modifications as fall within the true spirit and scope of my invention.

What I claim as new and desire to secure by Letters Patent of the United States is:

1. In combination, a piezo-electric element having a given operating frequency, input and output electrodes associated with said element and physically spaced from one another, a shield electrode associated with said element, interposed between said input and output electrodes and electrically insulated therefrom, a source of pulses having a repetition frequency lower than said given frequency coupled to said input electrode for shock-exciting said piezo-electric element whereby a plurality of oscillations at said given frequency are derived at said output electrode in response to each of said pulses, means for maintaining said shield electrode at a plane of reference potential to shield said input and output electrodes from one another, and a feed-back circuit coupling said output electrode to said input electrode and operative subsequent to the occurrence of a predetermined plurality of said oscillations for applying a portion of said oscillations to said input electrode in a phase relation with respect to said derived oscillations effective to damp said piezo-electric element.

2. In a system including an indicator for displaying the timing relationship of recurrent signal pulses relative to the time occurrence of recurrent, reference pulses, a marker generator comprising a piezo-electric element having a given operating frequency higher than the repetition frequency of said reference pulses, input and output electrodes associated with said element and physically spaced from one another, a shield electrode associated with said element, interposed between said input and output electrodes and electrically insulated therefrom, means responsive to each of said reference pulses for generating a first square wave of predetermined polarity and duration, means of applying said first square waves to said input electrode for shock-exciting said piezo-electric element whereby a plurality of oscillations at said given frequency are derived for said predetermined duration at said output electrode in response to each of said reference pulses, means responsive to each of said reference pulses for generating a second square wave of a given duration occurring upon the completion of the duration of said first wave, and means responsive to said second square wave for applying a portion of said derived oscillations from said output electrode to said input electrode in degenerative manner for damping said oscillations, means for maintaining said shield electrode at a plane of reference potential to shield said input and output electrodes from one another, and means coupling said output electrode to said indicator for producing a display of markers corresponding in timing with said oscillators to assist in the determination of the aforesaid timing relationship between said recurrent and reference pulses.

3. An arrangement for generating a plurality of oscillations timed with respect to the time occurrence of recurrent reference pulses comprising a piezo-electric element having a given operating frequency higher than the repetition frequency of said reference pulses, input and output electrodes associated with said element, a shield electrode associated with said element, interposed between said input and output electrodes and electrically insulated thearefrom, a multivibrator responsive to each of said reference pulses for generating a first square wave of given duration followed by a second square wave, means responsive to said first wave for shock-exciting said element whereby a plurality of oscillations at said given frequency are derived at said output electrode for said given duration in response to each of said reference pulses, means responsive to said second wave for applying a portion of said derived oscillations to said input electrode in degenerative manner to damp said piezo-electric element, and means for maintaining said shield electrode at a reference potential to shield said input and output electrodes from one another.

4. An arrangement for generating a plurality of oscillations timed with respect to the time occurrence of recurrent reference pulses comprising a piezo-electric element, input and output electrodes associated with said element, a shield electrode associated with said element, interposed between said input and output electrodes and electrically insulated therefrom, means for generating a first wave of a given duration followed by a second wave of a given duration, means responsive to said first wave for shock exciting said element whereby a plurality of oscillations at said given frequency are derived at said output electrode for said given duration in response to each of said reference pulses, means responsive to said second wave for applying a portion of said derived oscillations to said input electrode in degenerative manner to damp said piezo-electric element, and means for maintaining said shield electrode at a reference potential to shield said input and output electrodes from one another.

5. In combination, a piezo-electric element having a given operating frequency, input and output electrodes associated with said element and physically spaced from one another, a shield electrode associated with said element interposed between said input and output electrodes and electrically insulated therefrom, a source of pulses having a repetition frequency lower than said given frequency, means for generating a first and second square wave of predetermined duration in response to each of said pulses, means coupling said first wave to said input electrode of said element for shock exciting said element to generate a plurality of oscillations at said given frequency at said output electrode, a feedback circuit coupling said output electrode to said input electrode for applying a portion of said oscillations to said input electrode in a phase relation with respect to said generated oscillations effective to damp said piezo-electric element, means responsive to said second square wave for disabling said feedback circuit during said predetermined duration, and means for maintaining said shield electrode at a reference potential to shield said input and output electrodes from one another.

References Cited in the file of this patent

UNITED STATES PATENTS

| | | |
|---|---|---|
| 2,262,966 | Rohde | Nov. 18, 1941 |
| 2,274,486 | Koch | Feb. 24, 1942 |
| 2,469,174 | Okrent | May 3, 1949 |
| 2,475,625 | Lyons | July 12, 1949 |
| 2,504,852 | Lewis | Apr. 18, 1950 |
| 2,554,308 | Miller | May 22, 1951 |
| 2,573,070 | Stafford | Oct. 30, 1951 |
| 2,582,608 | Sherwin | Jan. 15, 1952 |

FOREIGN PATENTS

| | | |
|---|---|---|
| 653,102 | Great Britain | May 9, 1951 |
| 654,684 | Great Britain | June 27, 1951 |

OTHER REFERENCES

Kirkman: abstract of application Serial Number 527,321, published January 3, 1950, 370 O.G. 757.